(12) United States Patent
Sasaki (10) Patent No.: US 8,339,984 B2
(45) Date of Patent: Dec. 25, 2012

(54) AUTOMATIC NETWORK RETRIEVAL AND DISPLAY DEVICE

(75) Inventor: Koji Sasaki, Osaka (JP)

(73) Assignee: Panasonic Corporation, Osaka (JP)

( * ) Notice: Subject to any disclaimer, the term of this patent is extended or adjusted under 35 U.S.C. 154(b) by 288 days.

(21) Appl. No.: 12/787,244

(22) Filed: May 25, 2010

(65) Prior Publication Data

US 2010/0302963 A1    Dec. 2, 2010

(30) Foreign Application Priority Data

May 29, 2009   (JP) ................................. 2009-129877

(51) Int. Cl.
| | |
|---|---|
| H04L 12/28 | (2006.01) |
| H04L 12/56 | (2006.01) |
| H04B 7/212 | (2006.01) |
| H04J 3/16 | (2006.01) |
| H04J 3/22 | (2006.01) |
| H04J 3/24 | (2006.01) |

(52) U.S. Cl. ............. 370/252; 370/395.21; 370/395.3; 370/395.42; 370/395.43; 370/444; 370/445; 370/465; 370/475

(58) Field of Classification Search ................. None
See application file for complete search history.

(56) References Cited

U.S. PATENT DOCUMENTS

| 8,144,589 B2 * | 3/2012 | Meylan et al. | ................ 370/235 |
| 2004/0236849 A1 * | 11/2004 | Cooper et al. | ................ 709/224 |
| 2006/0111103 A1 | 5/2006 | Jeong et al. | |
| 2006/0206592 A1 | 9/2006 | Fujii et al. | |
| 2007/0064659 A1 * | 3/2007 | Li et al. | ................ 370/336 |

FOREIGN PATENT DOCUMENTS

| JP | 2001-251316 A | 9/2001 |
| JP | 2006-525748 A | 11/2006 |
| JP | 2007-142859 | 6/2007 |
| JP | 4125172 B2 | 5/2008 |

* cited by examiner

*Primary Examiner* — Xavier Szewai Wong
(74) *Attorney, Agent, or Firm* — Hamre, Schumann, Mueller & Larson. P.C.

(57) ABSTRACT

An automatic network retrieval and display device including: a transmission/reception processing unit 2 that receives information on at least one existing network and extracts error information and the like; a data conversion processing unit 4 that decides a connection state of each network on the basis of extracted information and outputs packet information lists in descending order of excellence in connection state; a network monitor processing unit 3 that extracts radio field intensity information from a network identifier and creates network identification information lists in decreasing order of radio field intensity; a network information establishment processing unit 5 that establishes a connection priority based on a communication state of the network on the basis of the network identification information list and the packet information list; a network switch processing unit 6 that connects to a network with a high priority on the basis of the connection priority of the network; and, a display unit 7 that displays a terminal on the connected network. This device can keep track of the communication state without requiring transmission of a packet used exclusively for displaying a communication state or requiring any terminal as a destination for transmission, and is connectable automatically to a network with a high priority.

4 Claims, 6 Drawing Sheets

AUTOMATIC NETWORK RETRIEVAL AND DISPLAY DEVICE

BACKGROUND OF THE INVENTION

1. Field of the Invention

The present invention relates to an automatic network retrieval and display device that monitors a network connection state, automatically switches the networks to be connected in accordance with an established priority, and displays a result of retrieval of terminals on a connected network.

2. Description of Related Art

Conventionally, in a case of connection to a wireless or wired network, such a connection is made to a network that has been registered previously as a network to be connected. In an alternative and known method, predetermined data are transmitted to and received from a repeater (server) on the network so as to examine the current communication state, and a network to be connected is decided based on the result, or notification to a user is conducted (see for example JP 2007-142859 A).

Figure 8:
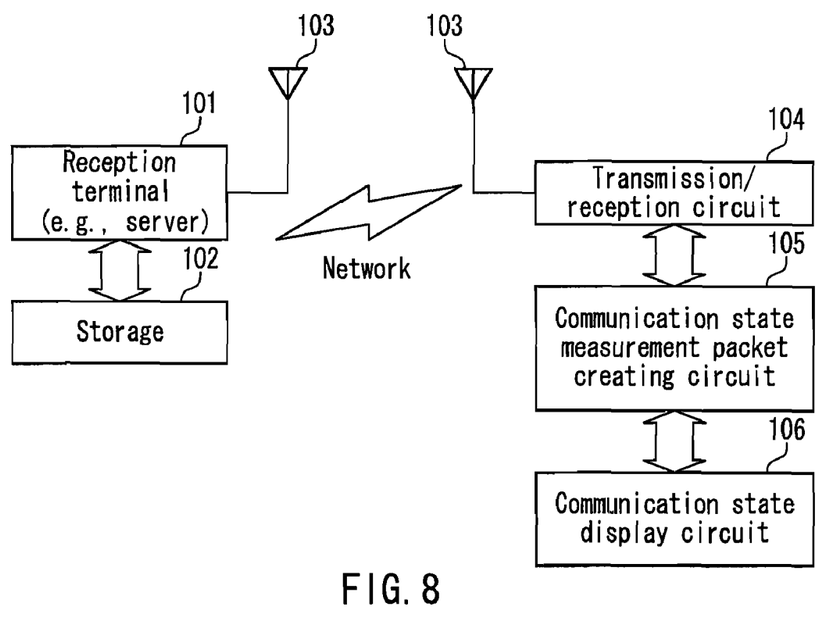
FIG. 8 is a block diagram showing a configuration of a conventional automatic network retrieval and display device.

FIG. 8 is a block diagram showing a typical configuration of a conventional automatic network retrieval and display device. In FIG. 8, a reception terminal 101 is a terminal that controls a network, such as a server having a storage 102, and it administers communication information for all of the terminals on the network.

Each terminal is connected onto the network via a transmission/reception circuit 104, and, for examining the communication state of a network 103, a communication state examination packet creating circuit 105 creates periodically examination packets and communicates with respect to the reception terminal 101.

At the reception terminal 101, a reception arrival time and the number of errors are counted on the basis of the received examination packet, and responses are sent back to the respective terminals.

Each of the terminals inputs the returned examination packet information into a communication state display circuit 106 and displays the acquired information directly.

The above described is a conventional and typical method for network automated retrieval and display. However, in such a conventional network automated retrieval and display method, a terminal for transmission such as a repeater is required in order to transmit communication information for examination onto the network. Further, periodic communications like transmission of a packet used exclusively for displaying a communication state are required to keep track of the communication state. Furthermore, it is required to determine a network to connect preferentially in accordance with the reception result. Further, under a circumference where there is no repeater (server), it is impossible to keep track of the communication state of the network.

SUMMARY OF THE INVENTION

Therefore, with the foregoing in mind, it is an object of the present invention to provide an automatic network retrieval and display device that can keep track of the current communication state without requiring transmission of a packet used exclusively for displaying a communication state or without requiring any terminal as a destination for transmission, and that can connect automatically to a network with a high priority by using network identification information.

For achieving the above-mentioned object, an automatic network retrieval and display device of the present invention is characterized in that it is connectable to an arbitrary network and it selects a network optimally capable of data communications and connects to the network. The automatic network retrieval and display device includes: a transmission/reception processing unit that receives information on at least one existing network and extracts size information, error information and collision packet occurrence information from the received data; a data conversion processing unit that decides a connection state of each network on the basis of each of the information extracted by the transmission/reception processing unit and that outputs packet information lists in descending order of excellence in connection state; a network monitor processing unit that extracts radio field intensity information from a network identifier existing on the network, creates and outputs network identification information lists in decreasing order of radio field intensity; a network information establishment processing unit that establishes a connection priority based on the communication state of the at least one existing network, on the basis of the network identification information list outputted by the network monitor processing unit and the packet information list outputted by the data conversion processing unit; a network switch processing unit that is to connect to a network with a high priority on the basis of information of network connection priority established at the network information establishment processing unit; and a display unit that displays a terminal on the network connected by the network switch processing unit.

According to the above-described configuration, it is possible to create a priority of currently connectable network identification information from a communication state analyzed on the basis of communication information data such as transmission/reception data, re-transmission data and loss data included in the information data on the network and also existing network identification information so as to connect automatically and conduct a terminal retrieval and display. Thereby, a connection to an information terminal existing on a network can be conducted easily without establishing previously information of a network for connection.

Furthermore, since there is no necessity of transmitting any particular data to a repeater (server), it is possible to retrieve easily a network that can connect with reduced network load.

DETAILED DESCRIPTION OF THE INVENTION

Based on the above-described configuration, an automatic network retrieval and display device of the present invention can be modified as described below.

Namely, the transmission/reception processing unit includes: a reception part A that receives current data information on the basis of arbitrary communication information existing on the connected network; a packet data storing part that stores packet data of the data information; a supplemental data storing part that stores supplemental data contained in the data information; and a reception data list creating part that creates a reception data list on the basis of an output of the packet data storing part and an output of the supplemental data storing part.

Further, the network monitor processing unit includes: a reception part B that receives current network information on the basis of arbitrary network information existing on the connected network; a network identification information detecting part that detects network identification information and radio field intensity information from an output of the reception part B; and a network identification information list creating part that creates a network identification information list on the basis of the information detected at the network identification information detecting part.

Further, the network information establishment processing unit includes: a packet information list detecting part that detects the packet information list created at the data conversion processing unit; a network identification information list detecting part that detects the network identification information list outputted by the network monitor processing unit; a network information comparing part that compares the detected packet information list and the detected network identification information list, compiles list information for each corresponding network so as to create a network information list; and a connection information list creating part that establishes the connection priority for each network in the network information list and creates a connection information list for conducting a network connection on the basis of prioritized information.

Hereinafter, an embodiment of the present invention will be described with reference to attached drawings.
(Embodiment)

Figure 1:
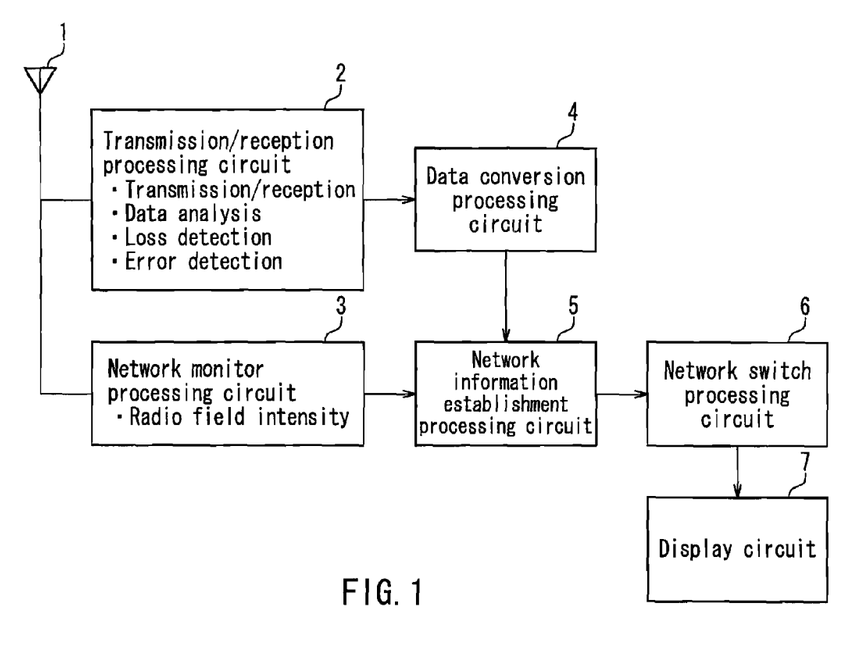
FIG. 1 is a block diagram showing a configuration of an automatic network retrieval and display device of an embodiment of the present invention.

FIG. 1 is a block diagram showing a configuration of an automatic network retrieval and display device of an embodiment of the present invention.

In this device, information on a network is received via a transmission/reception antenna 1 for a network connection. A transmission/reception processing circuit 2 acquires reception data (packet data) from the received information on the network. The transmission/reception processing circuit 2 stores the acquired reception data, and after conducting procedures as described below, creates a reception data list as analytical result information and inputs the reception data list into a data conversion processing circuit 4.

Similarly, a network monitor processing circuit 3 acquires reception data (network identification information) from information on the network, stores the reception data, and after conducting procedures as described below, creates a network identification information list and inputs the network identification information list into a network information establishment processing circuit 5.

With respect to the information of the reception data list as analytical result information outputted by the transmission/reception processing circuit 2, the data conversion processing circuit 4 prioritizes the information as network information and creates a packet information list, and outputs the packet information list into the network information establishment processing circuit 5.

The network information establishment processing circuit 5 conducts the procedures as described below on the basis of the packet information list outputted by the data conversion processing circuit 4 and the network identification information list outputted by the network monitor processing circuit 3, organizes a connection information list and outputs the connection information list into a network switch processing circuit 6.

The network switch processing circuit 6 switches automatically the networks in accordance with the connection information list outputted by the network information establishment processing circuit 5, and retrieves an information terminal on the network. The network switch processing circuit 6 creates an information terminal list from the retrieval result and outputs the information terminal list into a display circuit 7. The display circuit 7 displays the information terminal list information.

Figure 2:
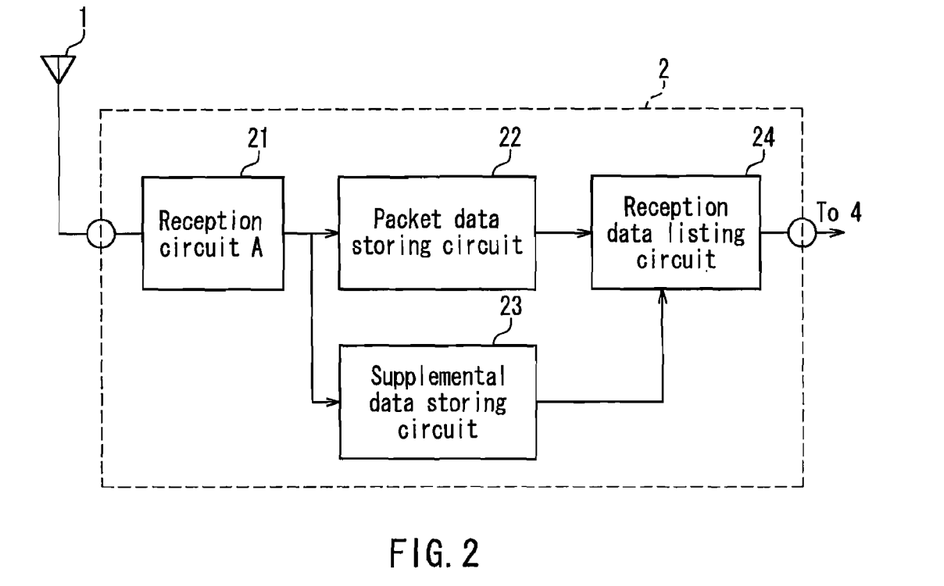
FIG. 2 is a block diagram showing a configuration of a transmission/reception processing circuit in the automatic network retrieval and display device.

FIG. 2 is a block diagram showing a configuration of the transmission/reception processing circuit 2 in the automatic network retrieval and display device of FIG. 1. The transmission/reception processing circuit 2 is formed of a reception circuit A 21, a packet data storing circuit 22, a supplemental data storing circuit 23, and a reception data list creating circuit 24.

In FIG. 2, the reception circuit A 21 is a circuit that receives all packet data on the network received via the transmission/reception antenna 1, and the reception circuit A 21 outputs the received packet data into the subsequent packet data storing circuit 22 and supplemental data storing circuit 23.

The packet data storing circuit 22 extracts basic information (network identification, packet size, data type information and the like) from the received packet data, stores the basic information on a predetermined memory and notifies the reception data list creating circuit 24.

The supplemental data storing circuit 23 extracts supplemental data (network information, re-transmission information, error information, collision packet occurrence information and the like) from the received packet data, stores the supplemental data on a predetermined memory and notifies to the reception data list creating circuit 24.

The reception data list creating circuit 24 creates a reception data list on the basis of the notified basic information and supplemental information and outputs the reception data list into the data conversion processing circuit 4 (FIG. 1).

According to this configuration, it is possible to output a reception data list as reception data information on the basis of the current data information received at the reception circuit A 21 and the supplemental data stored in the supplemental data storing circuit 23, without transmitting any particular packet data for retrieval onto a network.

Figure 3:
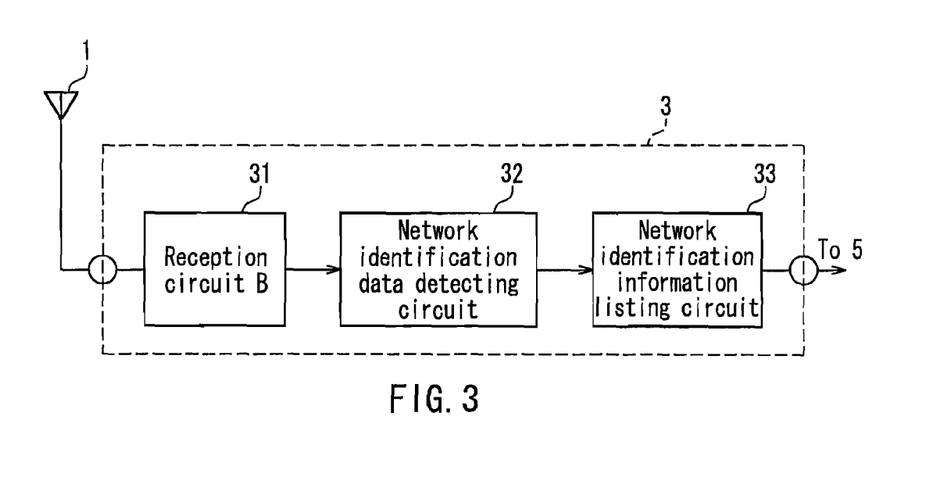
FIG. 3 is a block diagram showing a configuration of a network monitor processing circuit in the automatic network retrieval and display device.

FIG. 3 is a block diagram showing a configuration of the network monitor processing circuit 3 in the automatic network retrieval and display device of FIG. 1. The network monitor processing circuit 3 is formed of a reception circuit B 31, a network identification information detecting circuit 32, and an identification information list creating circuit 33.

In FIG. 3, the reception circuit B 31 receives network information on the network via the transmission/reception antenna 1 and outputs the network information into the network identification information detecting circuit 32.

The network identification information detecting circuit 32 extracts network identification information (network identifier) from the received network information, detects radio field intensity information, transfer rate information and the like, and outputs the information into the identification information list creating circuit 33.

The identification information list creating circuit 33 establishes a priority of the inputted network information in decreasing order of radio field intensity and in decreasing order of transfer rate, creates a network identification information list and outputs the network identification information list into the network information establishment processing circuit 5 (FIG. 1).

According to this configuration, it is possible to create a prioritized network identification information list from the information on the currently existing network, and to determine a network for connection on the basis of the created network identification information list.

Figure 4:
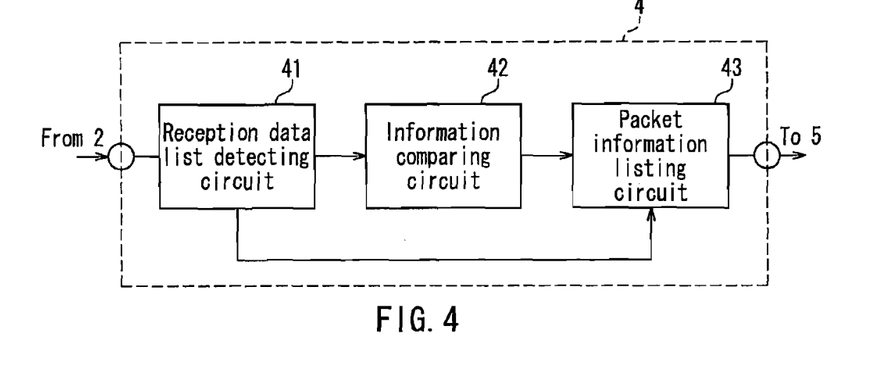
FIG. 4 is a block diagram showing a configuration of a data conversion processing circuit in the automatic network retrieval and display device.

FIG. 4 is a block diagram showing a configuration of the data conversion processing circuit 4 in the automatic network retrieval and display device of FIG. 1. The data conversion processing circuit 4 is formed of a reception data list detecting circuit 41, an information comparing circuit 42, and a packet information list creating circuit 43.

In FIG. 4, the reception data list detecting circuit 41 separates the reception data list outputted by the transmission/reception processing circuit 2 per unit of list data and outputs into the information comparing circuit 42. Here, a unit of list data denotes a group of data extracted from data of one packet.

The information comparing circuit 42 makes comparison for the inputted list data in the amount of the transmitted/received information and in the amount of the error related information between the present value and the previous value, and outputs the comparison result into the packet information list creating circuit 43.

The packet information list creating circuit 43 prioritizes and permutates the reception data lists in decreasing order of amount of the transmitted/received information and in increasing order of error-related information on the basis of the comparison result made at the information comparing circuit 42 and the reception data list outputted by the reception data list detecting circuit 41. The thus created packet information list is outputted into the subsequent network information establishment processing circuit 5.

Figure 5:
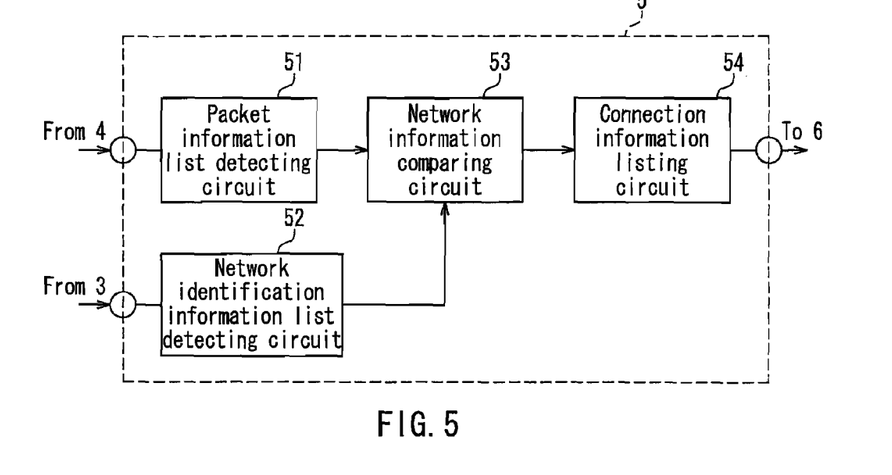
FIG. 5 is a block diagram showing a configuration of a network information establishment processing circuit in the automatic network retrieval and display device.

FIG. 5 is a block diagram showing a configuration of the network information establishment processing circuit 5 in the automatic network retrieval and display device of FIG. 1. The network information establishment processing circuit 5 is formed of a packet information list detecting circuit 51, a network identification information list detecting circuit 52, a network information comparing circuit 53, and a connection information list creating circuit 54.

In FIG. 5, the packet information list detecting circuit 51 detects a packet information list outputted by the data conversion processing circuit 4, and outputs the detected list into the network information comparing circuit 53. The network identification information list detecting circuit 52 detects the network identification information list outputted by the network monitor processing circuit 3, and outputs the detected list into the network information comparing circuit 53.

The network information comparing circuit 53 collates the inputted packet information list and the network identification information list so as to detect list information with which the basic information (identification information) agrees, combines information of corresponding lists so as to create a network information list, and outputs the network information list into the connection information list creating circuit 54.

With respect to the list information of the inputted network information lists, the connection information list creating circuit 54 establishes a priority further in accordance with the intensity of the radio field, the transmitted/received information amount and the condition of the error information, and creates a connection information list. The created connection information list is outputted into the network switch processing circuit 6.

According to this configuration, it is possible to prioritize automatically the connection information lists while monitoring the communication state on the network and the existing network identification information, and to conduct an automatic connection based on the created connection information lists.

Figure 6:
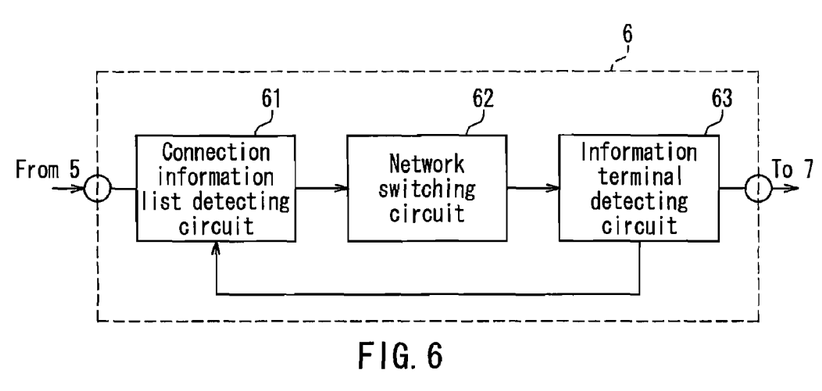
FIG. 6 is a block diagram showing a configuration of a network switch processing circuit in the automatic network retrieval and display device.

FIG. 6 is a block diagram showing a configuration of the network switch processing circuit 6 in the automatic network retrieval and display device of FIG. 1. The network switch processing circuit 6 is formed of a connection information list detecting circuit 61, a network switching circuit 62, and an information terminal detecting circuit 63.

In FIG. 6, the connection information list detecting circuit 61 detects a prioritized connection information list outputted by the network information establishment processing circuit 5, and outputs the connection information in decreasing order of priority into the network switching circuit 62.

The network switching circuit 62 modifies the network establishment in accordance with the inputted connection information and conducts a connection with respect to a predetermined network. At the time of completing the connection, the network switching circuit 62 notifies a connection completion notification to the information terminal detecting circuit 63.

At the time of receiving the connection completion notification, the information terminal detecting circuit 63 retrieves the existence/presence of information terminals on the network, and creates an information terminal list on the basis of the retrieval result. When deciding that there is no information terminal, the information terminal detecting circuit 63 outputs a next list establishment request to the connection information list detecting circuit 61 in order to switch to a network having the second highest priority.

At the time that the next list establishment request notification is inputted from the information terminal detecting circuit 63, the connection information list detecting circuit 61 outputs connection information with the second highest priority into the network switching circuit 62. The series of operations are repeated by the time an information terminal list is displayed or connection information of the connection information list comes to an end.

The information terminals list is outputted into the display circuit 7 and displayed as information terminal information by the display circuit 7.

Figure 7A:
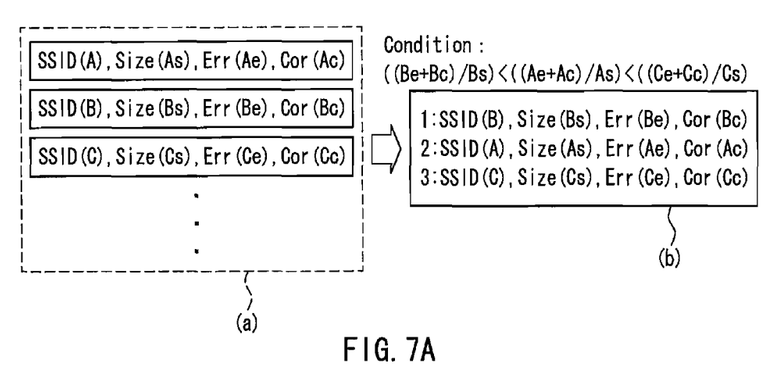
FIGS. 7A-7C are diagrams for explaining specific operation procedures of the automatic network retrieval and display device.
Figure 7B:
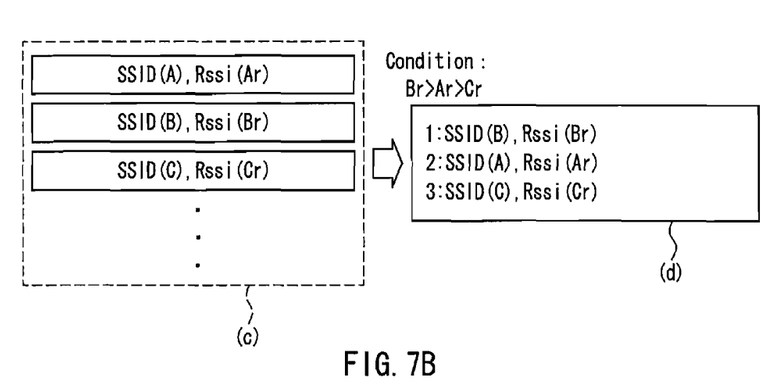
Figure 7C:
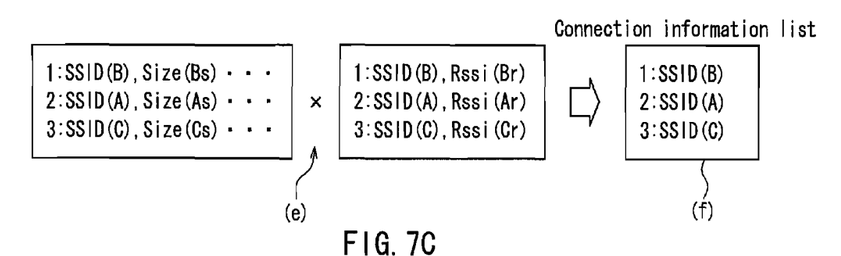

FIGS. 7A-7C are diagrams for explaining an example of specific procedures in the automatic network retrieval and display device of FIG. 1.

When detecting information that exists on a network, the transmission/reception processing circuit 2 extracts from the detected network information, as shown in FIG. 7A(a) for example, size information Size (indicated as As, Bs, Cs or the like in FIG. 7A(a)), error information Err (Ae, Be, Ce or the like) and collision packet occurrence information Cor (Ac, Bc, Cc or the like) for each of network identification information SSID(A), SSID(B), SSID(C) and the like, and outputs as a reception data list into the data conversion processing circuit 4.

The data conversion processing circuit 4 compares respectively the extracted network (packet) information included in the reception data list. Namely, the connection state of the network is decided on the basis of the extracted size information Size, error information Err, and collision packet occurrence information Cor. For example, a size comparison is made on the basis of the relationship between the (error information Err+collision packet occurrence information Cor) and the size information Size, and the network packet information is listed in increasing order of error occurrence with respect to information amount.

In the example as shown in FIG. 7A(b), in a case where there is a relationship of ((Be+Bc)/Bs)<((Ae+Ac)/As<((Ce+Cc)/Cs), the packet information list is created by listing the network packet information in the order of SSID(B), SSID(A) and SSID(C). The created packet information list is inputted into the network information establishment processing circuit 5.

The network monitor processing circuit 3 detects network identification information SSID(A), SSID(B), SSID(C) and the like, and as shown in FIG. 7B(c), the network monitor processing circuit 3 extracts radio field intensity information Rssi from the network identification information. In this example, the radio field intensity of SSID(A) is (Ar), the radio field intensity of SSID(B) is (Br), and the radio field intensity of SSID(C) is (Cr). And the network monitor processing circuit 3 permutates the network identification information SSIDs in decreasing order of radio field intensity Rssi. For example, as shown in FIG. 7B(d), when the radio field intensity is Br>Ar>Cr, the network monitor processing circuit 3 creates the network identification information list in the order of SSID(B), SSID(A), SSID(C). The created network identification information list is inputted into the network information establishment processing circuit 5.

Using the data of the created two lists, the network information establishment processing circuit 5 conducts predetermined procedures (weighting, for example) for establishing a decreasing order of priority and creates a connection information list. For example, in a case of procedure as shown in FIG. 7C(e), since both the SSID(B)s are located at the tops of the lists, the SSID(B) is registered in the list, as the network to be connected with the highest priority. The created connection information list (FIG. 7C(f) is inputted into the network switch processing circuit 6, and as mentioned above, an automatic connection with respect to the network is conducted.

According to the above described configuration, it is possible to create a connection information list by establishing the priority for the network information to connect by use of information included in the network information existing on the network, and to conduct a network automatic connection procedure by using the created connection information list. Thereby, since it is possible to determine a network for connection without transmitting any particular packet onto the network, a list can be created without applying network loading or without conducting any preprocess.

As described above, the present invention provides an automatic network retrieval and display device that can keep track of the current communication state without requiring transmission of a packet used exclusively for displaying a communication state or without requiring any terminal as a destination for transmission, and that can create a network list for connection.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An automatic network retrieval and display device that is connectable to an arbitrary network and that selects a network in a condition of optimal data communications and connects to the network, the automatic network retrieval and display device comprising:
   a transmission/reception processing unit that receives information on at least one existing network and extracts size information, error information and collision packet occurrence information from the received data;
   a data conversion processing unit that decides a connection state of each network on the basis of a ratio of a total amount of the error information and the collision packet occurrence information with respect to the size information that are extracted by the transmission/reception processing unit, and outputs a packet information list in descending order of excellence in the connection state;
   a network monitor processing unit that extracts radio field intensity information from a network identifier existing on the network, creates and outputs a network identification information list in decreasing order of radio field intensity;
   a network information establishment processing unit that establishes a connection priority based on the communication state of the at least one existing network, on the basis of a combination of the network identification information list outputted by the network monitor processing unit and the packet information list outputted by the data conversion processing unit;
   a network switch processing unit that is to connect to a network with a high priority on the basis of information of network connection priority established at the network information establishment processing unit; and
   a display unit that displays a terminal on the network connected by the network switch processing unit.

2. The automatic network retrieval and display device according to claim 1, wherein the transmission/reception processing unit comprises:
   a reception part A that receives current data information on the basis of arbitrary communication information existing on the connected network;
   a packet data storing part that stores packet data of the data information;
   a supplemental data storing part that stores supplemental data contained in the data information; and
   a reception data list creating part that creates a reception data list on the basis of an output of the packet data storing part and an output of the supplemental data storing part.

3. The automatic network retrieval and display device according to claim 1, wherein the network monitor processing unit comprises:
   a reception part B that receives current network information on the basis of arbitrary network information existing on the connected network;
   a network identification information detecting part that detects network identification information and radio field intensity information from an output of the reception part B; and
   a network identification information list creating part that creates a network identification information list on the basis of the information detected at the network identification information detecting part.

4. The automatic network retrieval and display device according to claim 1, wherein the network information establishment processing unit comprises:
- a packet information list detecting part that detects the packet information list created at the data conversion processing unit;
- a network identification information list detecting part that detects the network identification information list outputted by the network monitor processing unit;
- a network information comparing part that compares the detected packet information list and the detected network identification information list, compiles list information for each corresponding network so as to create a network information list; and
- a connection information list creating part that establishes the connection priority for each network in the network information list and creates a connection information list for conducting a network connection on the basis of prioritized information.

* * * * *